(12) United States Patent
Guglielmi et al.

(10) Patent No.: US 10,843,872 B2
(45) Date of Patent: Nov. 24, 2020

(54) GUIDE MODULE FOR MAKING A MOVEMENT PLANE

(71) Applicant: FIVES INTRALOGISTICS S.P.A. CON SOCIO UNICO, Lonate Pozzolo (IT)

(72) Inventors: Dario Guglielmi, Malnate (IT); Marco Zangirolami, Val Della Torre (IT); Massimo Povolo, Robecchetto (IT); Mario Camillo Radaelli, Legnano (IT)

(73) Assignee: FIVES INTRALOGISTICS S.P.A. CON SOCIO UNICO, Lonate Pozzolo (IT)

( * ) Notice: Subject to any disclaimer, the term of this patent is extended or adjusted under 35 U.S.C. 154(b) by 0 days.

(21) Appl. No.: 16/599,295

(22) Filed: Oct. 11, 2019

(65) Prior Publication Data

US 2020/0122932 A1 Apr. 23, 2020

(30) Foreign Application Priority Data

Oct. 22, 2018 (IT) .......................... 102018000009647

(51) Int. Cl.
*B65G 39/02* (2006.01)
*B65G 47/54* (2006.01)
*B65G 39/12* (2006.01)

(52) U.S. Cl.
CPC .......... *B65G 39/025* (2013.01); *B65G 47/54* (2013.01); *B65G 39/12* (2013.01)

(58) Field of Classification Search
CPC ...... B65G 13/065; B65G 47/54; B65G 39/12; B65G 39/10; B65G 13/10; B65G 39/025

USPC .................................................... 198/370.09
See application file for complete search history.

(56) References Cited

U.S. PATENT DOCUMENTS

| | | | | |
|---|---|---|---|---|
| 5,921,374 | A * | 7/1999 | Takino | ................... B65G 47/54 193/35 MD |
| 6,889,815 | B2 * | 5/2005 | Kanamori | ............ B65G 1/0478 198/369.4 |
| 9,499,341 | B2 | 11/2016 | Wilkins | |
| 9,505,557 | B2 * | 11/2016 | Wilkins | ................. B65G 13/10 |
| 9,745,143 | B2 * | 8/2017 | Wilkins | ............... B65G 39/025 |
| 9,790,044 | B2 * | 10/2017 | Ortmann | .................. B65H 9/04 |
| 9,878,856 | B2 * | 1/2018 | Specht | .................... B65G 13/10 |
| 2014/0116841 | A1 | 5/2014 | Wilkins | |
| 2015/0375939 | A1 | 12/2015 | Garehan | |

(Continued)

FOREIGN PATENT DOCUMENTS

| | | |
|---|---|---|
| DE | 102016107665 A1 | 10/2017 |
| EP | 3315436 | 5/2018 |
| WO | 2014066838 A1 | 5/2014 |

*Primary Examiner* — James R Bidwell
(74) *Attorney, Agent, or Firm* — Pearne & Gordon LLP

(57) ABSTRACT

A guide module (1) for making a movement plane including: a rotation unit (20) rotatable about a longitudinal axis (Z); a ball (30) mounted on the rotation unit (20) a respective actuation pin (31) rotatable relative to the rotation unit (20) about a transversal axis (X), perpendicular to the longitudinal axis (Z), the transversal axis (X) being fixed relative to the rotation unit (20); a first actuator (52) acting on the rotation unit (20) for moving in an adjustable fashion the rotation unit (20) about the longitudinal axis (Z); and a second actuator (54) acting on the actuation pin (31) of the ball (30) for moving the ball (30) about the transversal axis (X).

20 Claims, 4 Drawing Sheets

(56) References Cited

U.S. PATENT DOCUMENTS

2016/0101958 A1 4/2016 Park et al.
2016/0229638 A1* 8/2016 Wilkins ................. B65G 13/10
2018/0111767 A1 4/2018 Itoh et al.

* cited by examiner

GUIDE MODULE FOR MAKING A MOVEMENT PLANE

This invention relates to the technical sector of systems for sorting objects. In particular, the invention relates to a guide module for making a modular movement plane for sorting objects. The invention also relates to a modular movement plane for the sorting of objects.

In the transport and logistics sector, systems for sorting packs and other objects are particularly important.

Traditionally, these systems comprise a main conveyor which moves the packs and the objects to be sorted along a path and to which are connected various secondary conveyors which, according to predetermined criteria, receive the packs from the main conveyor and transport them to respective distribution stations.

Various solutions have been developed over the years to allow the packs to leave the main conveyor and diverge along their path towards the secondary conveyor.

One of these solutions involves the use of special carriages which move the pack along the main conveyor and are equipped with laterally oriented rollers which are actuated at the correct moment for directing the pack towards the desired secondary conveyor.

Another system in use comprises the use of units movable above the main conveyor and configured for making contact with or engaging laterally the packs for directing them towards the secondary conveyors.

Systems of rollers are also in use which are transversal or oblique relative to the direction of the main conveyor and movable through openings in the movement plane of the packs. The rollers are thus able to emerge and disappear on command in such a way as to engage only predetermined packs and divert them on the basis of the desired movement.

Disadvantageously, the systems described are limited to sorting the packs and do not allow a complete and/or precise control of the parameters for positioning and moving the pack on the respective conveyors.

In this context, the technical purpose which forms the basis of the invention is to provide a guide module for making a movement plane and a relative modular movement plane which overcomes at least some of the above-mentioned drawbacks of the prior art.

More specifically, the aim of the invention is to provide a guide module and a relative modular movement plane which is able to allow a more complete and/or precise control of the position and movement parameters of the packs with respect to the prior art sorting systems.

A further aim of the invention is to provide a modular movement plane for sorting objects which is easily scalable and adaptable to systems and/or objects of different sizes.

The technical purpose indicated and the aims specified are substantially achieved by a guide module and a relative modular movement plane comprising the technical features described in one or more of the appended claims.

The dependent claims correspond to possible embodiments of the invention.

Further features and advantages of the invention are more apparent in the non-limiting description which follows of a preferred embodiment of a guide module and a relative modular movement plane illustrated in the accompanying drawings.

The description is set out below with reference to the accompanying drawings which are provided solely for purposes of illustration without restricting the scope of the invention and in which.

Figure 1:
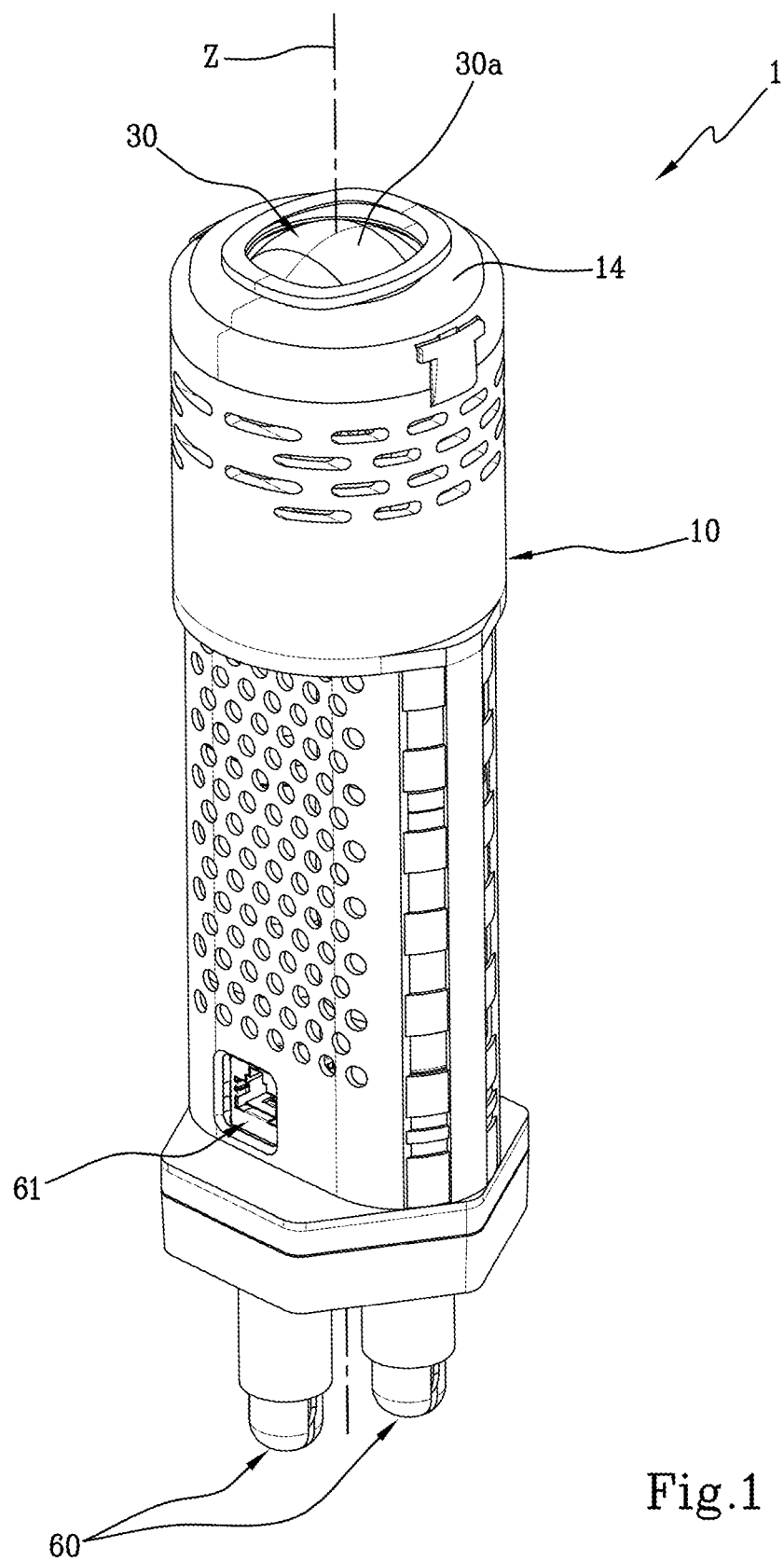
FIG. 1 is a perspective view of a guide module made according to the invention.
Figure 2:
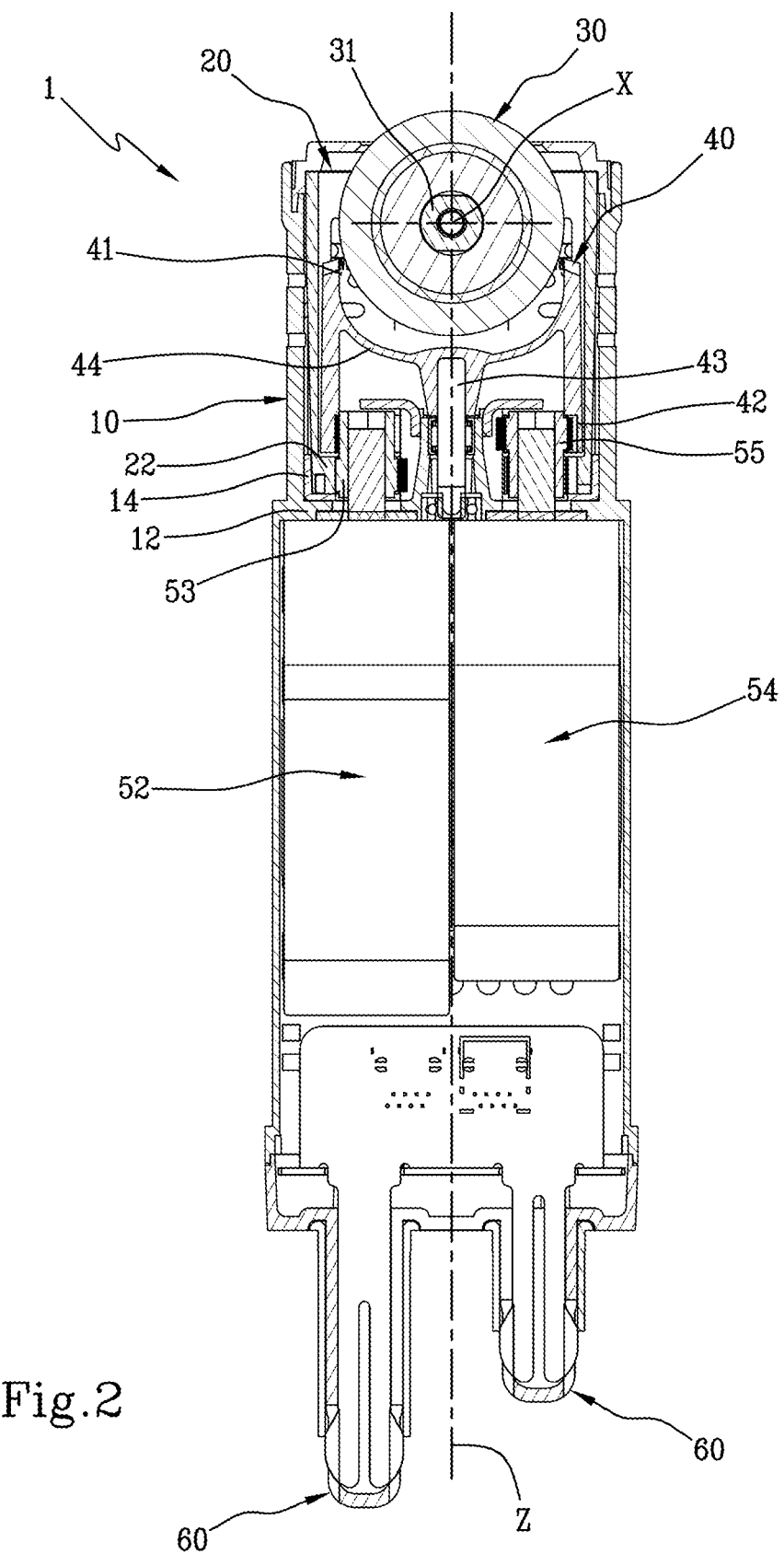
FIG. 2 is a cross section view of the guide module of FIG. 1 with some elements hidden to better illustrate others.
Figure 3:
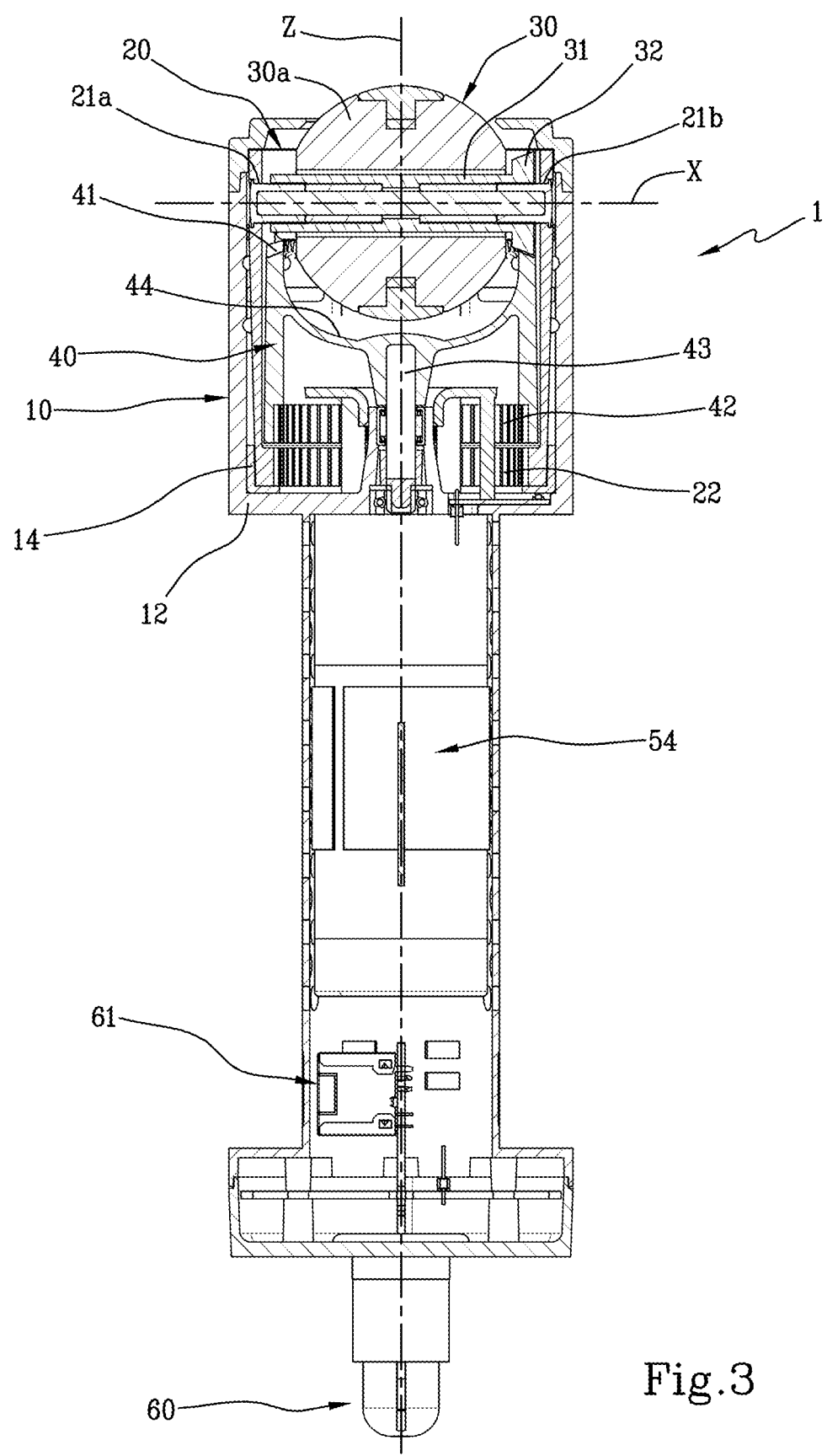
FIG. 3 shows a different cross section view of the guide module of FIG. 1 with some elements hidden to better illustrate others.
Figure 4:
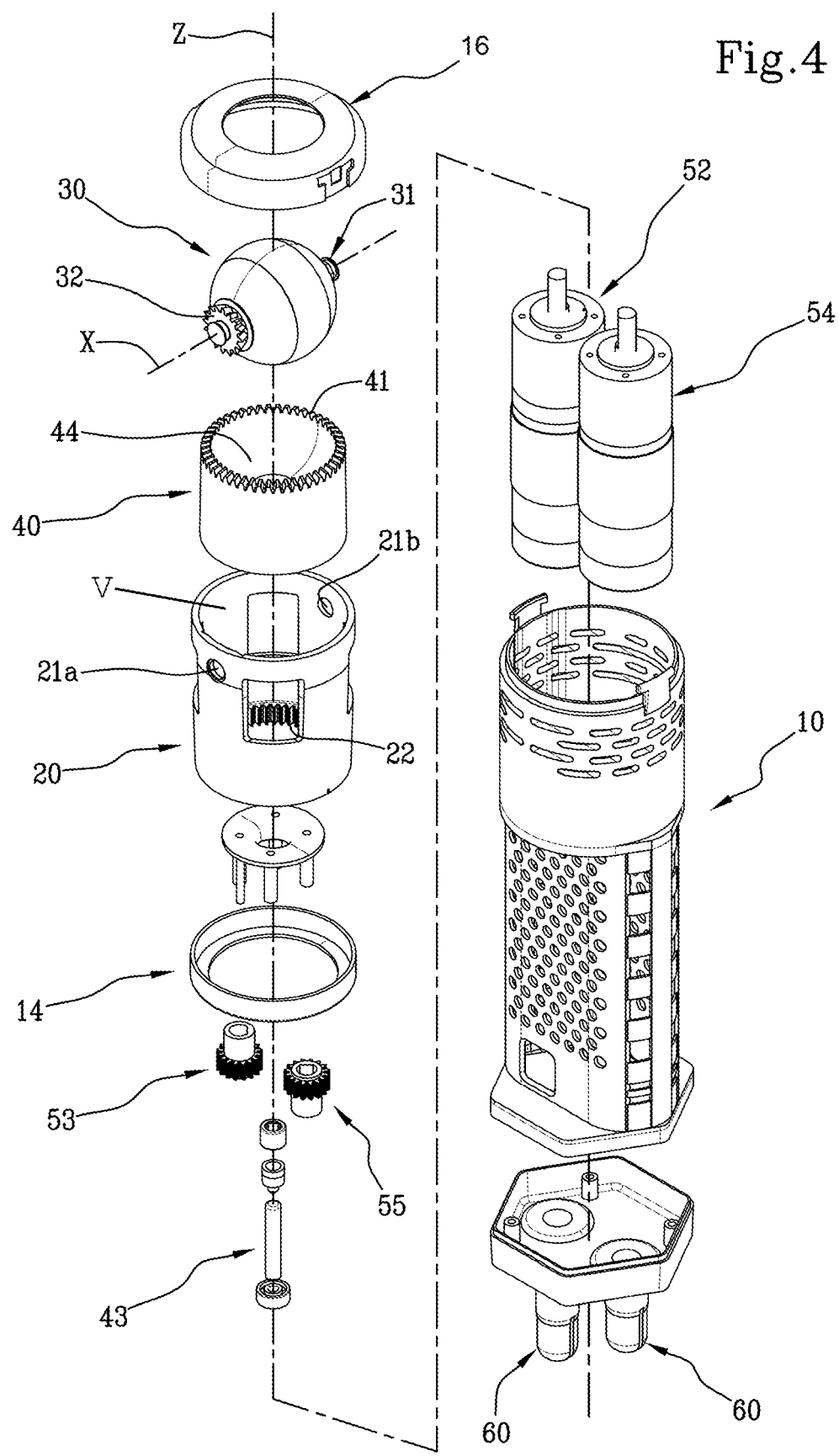
FIG. 4 is an exploded perspective view of the guide module of FIG. 1 with some elements hidden to better illustrate others.

With reference to the accompanying drawings, a guide module for making a modular movement plane is indicated generically with the numeral 1 and it will be referred to below simply as "guide module 1".

The guide module 1 comprises an outer containment body 10 having a tubular shape, positioned and configured in such a way as to protect and/or support at least some of the components of the guide module 1 described below.

Preferably, the outer body 10 defines an outer surface for coupling the guide module 1 with a prismatic and preferably hexagonal shape configured to allow a plurality of identical guide modules 1 to be connected to a shared mask according to a predetermined orientation to define a modular movement plane.

Housed inside the outer body 10, the guide module 1 comprises a rotation unit 20 rotatable about a longitudinal axis "Z".

According to a preferred configuration of use of the guide module 1, the longitudinal axis "Z" is oriented vertically relative to a horizontal plane.

Preferably, the rotation unit 20 is supported by the outer body 10 in such a way as to rotate relative to it.

According to the preferred embodiment, the outer body 10 has a supporting surface 12 on which there is a cup-shaped body 14 shaped to match an inner surface of the outer body 10.

Preferably, the rotation unit 20 is supported by the cup-shaped body 14, interposed between it and the outer body 10, in such a way as to rotate about the longitudinal axis "Z" relative to the outer body 10 without rubbing against the latter.

Preferably, the rotation unit 20 has a tubular shape about the longitudinal axis "Z" and defines an inner containment space "V" inside of which are housed further components of the guide module 1, described below.

At a relative first end, the rotation unit 20 has two seats facing each other for an actuation pin 31 passing through the longitudinal axis "Z".

Preferably, the seats are defined by a pair of holes 21a and 21b facing each other and made at respective diametrically opposite portions of the rotation unit 20.

Preferably, at a relative portion opposite or distal from the seats for the actuation pin 31, the rotation unit 20 has a row of guide teeth 22 defined by radial teeth facing towards the longitudinal axis "Z".

The guide module 1 comprises a ball 30 mounted in a rotatable fashion on the rotation unit 20 by means of the actuation pin 31 in such a way as to rotate about a transversal axis "X", perpendicular to the longitudinal axis "Z".

Preferably, the ball 30 is keyed on the actuation pin 31 in such a way that the latter is rotationally integral with the ball 30.

Moreover, the actuation pin 31 has at a relative end a transmission pinion 32 configured for rotating the ball 30 about the transversal axis "X".

The orientation of the actuation pin 31 defines the transversal axis direction "X", which is fixed relative to the rotation unit 20 and which can be oriented by means of a rotation of the latter in a horizontal plane relative to the preferred configuration of use of the guide module 1.

Preferably, a main portion of the ball 30 and the entire actuation pin 31 are positioned inside the outer body 10, whilst an apical portion 30a of the ball 30 protrudes from it, in particular upwards with reference to the preferred configuration of use of the guide module 1.

The outer body 10 also has an end cap 16 with a substantially annular shape which has a central opening through which the apical portion 30a of the ball 30 protrudes.

Preferably, the end cap 16 has an outer surface configured to define a sliding plane perpendicular to the longitudinal axis "Z", preferably oriented horizontally relative to the preferred configuration of use of the guide module 1.

In particular, the outer surface is configured to be aligned and operate in conjunction with the similar outer surfaces of identical guide modules 1 to define a common sliding plane from which the balls 30 of the individual guide modules 1 protrude.

Preferably, the above-mentioned apical portion 30a is defined by a percentage of the radius of the ball 30 of between 10% and 40%, even more preferably between 20% and 30%.

Preferably, the guide module 1 also comprises a transmission unit 40 rotatable about the longitudinal axis "Z", in a coaxial fashion relative to the rotation unit 20, configured for moving the ball 30 about the transversal axis "X".

Preferably, the transmission unit 40 is supported in position by a central pin 43 rotatable about the longitudinal axis "Z" and connected to a support integral with or connected to the outer body 10.

Preferably, the transmission unit 40 has a tubular shape, is housed inside the inner space "V" defined by the rotation unit 20 and in turn houses a main portion of the ball 30.

In particular, an outer surface of the transmission unit 40 is preferably shaped to match a corresponding inner surface of the rotation unit 20.

Moreover, the transmission unit 40 preferably has a counter-shaped portion 44 for connection to the central pin 43, preferably cup-shaped.

The transmission unit 40 has at a relative first end, in particular the upper end relative to the preferred configuration of use of the guide module 1, a first ring gear 41 meshed with the transmission pinion 32 in such a way that a rotation of the transmission unit 40 about the longitudinal axis "Z" actuates a rotation of the ball 30 about the transversal axis "X".

Preferably, the first ring gear 41 is defined by a row of front teeth aligned along the longitudinal axis "Z" and extending upwards according to the preferred configuration of use of the guide module 1.

Moreover, the transmission unit 40 comprises, at or close to a relative second end opposite the first end, in particular the lower end according to the preferred configuration of use, a second ring gear 42 configured to allow the actuation of a rotation of the transmission unit 40 about the longitudinal axis "Z".

Preferably, the second ring gear 42 is defined by a row of radial teeth facing towards the longitudinal axis "Z" and distributed in a horizontal plane according to the preferred configuration of use.

Preferably, the second ring gear 42 of the rotation unit 40 and the row of guide teeth 22 of the rotation unit 20 are substantially concentric and extend in parallel planes and in a position alongside each other, wherein the second ring gear 42 is positioned above the row of guide teeth 22 according to the preferred configuration of use of the guide module 1.

The guide module 1 also comprises a first actuator 52 acting on the rotation unit 20 for moving it in an adjustable fashion about the longitudinal axis "Z" and a second actuator 54 acting on the actuation pin 31 of the ball 30 for moving the latter about the transversal axis "X". According to the preferred embodiment, both the first and the second actuator 52 and 54 are rotary electric motors.

Preferably, the first and the second actuators 52 and 54 are positioned alongside and adjacent to each other, oriented parallel to each other and preferably parallel to the longitudinal axis "Z".

Preferably, both the first and the second actuators 52 and 54 have a respective rotary shaft projecting towards the ball 30 and parallel to the longitudinal axis "Z", in a position offset relative to it.

The first actuator 52 comprises an actuation pinion 53 keyed on the respective shaft and having a meshing with the row of guide teeth 22 of the rotation unit 20.

Similarly, the second actuator 54 comprises a further actuation pinion 55 keyed on the respective shaft and having a meshing with second ring gear 42 of the transmission unit 40.

In that way, an actuation of the first actuator 52 causes a rotation of the ball 30 about the longitudinal axis "Z", whilst an actuation of the second actuator 54 causes a rotation of the ball 30 about the transversal axis "X".

In order to power the first and the second actuator 52 and 54, the guide module 1 has one or more pins 60 configured to engage respective sockets during the coupling of the pin in a respective supporting mask.

It should be noted that, in the configuration described above, an actuation of the first actuator 52 determines, in addition to the rotation of the ball 30 about the longitudinal axis "Z", a secondary effect of rotation of the ball 30 about the transversal axis "X", which is added algebraically to the effect of the second actuator 54.

This secondary effect is determined by the movement of the transmission pinion 32 relative to the transmission unit 40 and to which it is meshed following the rotation of the ball 30 about the longitudinal axis "Z".

The guide module 1 also comprises a control unit connected to the first and second actuators 52 and 54 and configured to receive at least a first control signal of rotation of the ball 30 around the longitudinal axis "Z" and a second control signal of rotation of the ball 30 around the transversal axis "X".

Preferably, the guide module 1 has a connector 61 for a signal cable connected to the control unit for transmitting to the latter the first and the second control signal.

The control unit is configured for controlling the first actuator 52 as a function of the first control signal, for determining a rotation of the ball 30 about the longitudinal axis "Z" according to the commands contained in the first control signal.

The control unit is also configured for controlling the second actuator 54 as a function of the second control signal and in a compensated fashion as a function of the first control signal.

In other words, the control unit is configured for calculating the above-mentioned secondary effect of rotation of the ball 30 about the transversal axis "X" following a rotation of it about the longitudinal axis "Z" and for actuating the second actuator 54 in such a way as to compensate for the secondary effect.

Preferably, the guide module 1 has a prismatic coupling surface, and preferably hexagonal, configured to allow a plurality of identical guide modules 1 to be connected to a shared mask (in particular by inserting pins 60 in the respective sockets) according to a predetermined orientation, to define a movement plane.

Preferably, according to the predetermined orientation the longitudinal axes "Z" of each guide module 1 are oriented perpendicularly to the support mask and in particular vertically relative to the preferred configuration of use. The positioning of each guide module 1 on the support mask is variable so as to be functional for inserting the pins 60 in the respective sockets.

Another object of this invention is a modular movement plane for sorting objects comprising a plurality of guide modules 1 of the type described above.

The movement plane also comprises a supporting mask configured for supporting the guide modules 1 in a matrix configuration in such a way as to define a sliding plane engaged by the balls 30 of the guide modules 1.

Preferably, the supporting mask has a plurality of sockets configured for receiving the pins 60 of the guide modules 1 for determining an electrical power supply and/or signal connection with the guide modules 1.

Preferably, the pins 60 are configured to engage the respective sockets of the supporting mask immediately during a positioning of the guide modules 1 on the supporting mask in the matrix configuration.

Preferably, in the matrix configuration the prismatic coupling surfaces of the guide modules 1 are positioned in contact with or resting against each other to define a cell-like arrangement.

Moreover, the sockets and the pins 60 are preferably configured to support the respective guide modules 1 in the configuration of use, wherein the latter have the respective longitudinal axes "Z" oriented parallel to each other and perpendicular to the supporting mask.

Preferably, the movement plane also has a respective control unit configured to coordinate the control units of the individual guide modules 1 in such a way as to coordinate the rotation of the respective balls 30.

The invention achieves the set aim by overcoming the drawbacks of the prior art.

Advantageously, the guide module described allows the production of a movement plane of modular type, which is easily scalable and adaptable to objects and packs of different sizes, weights and features.

Moreover, the movement plane allows, by means of coordination between the various guide modules, a precise control of the position and the movement of the individual objects and the execution of movements of different type, including sorting, alignment, transport, separation of objects and rotation of each object about its axis, that is to say, basically an axis at right angles to the plane of extension of the object moved.

The invention claimed is:

1. A guide module (1) for making a movement plane, comprising:
a rotation unit (20) rotatable about a longitudinal axis (Z);
a ball (30) mounted on the rotation unit (20) by means of a respective actuation pin (31) in a rotatable fashion relative to the rotation unit (20) about a transversal axis (X), perpendicular to the longitudinal axis (Z), the transversal axis (X) being fixed relative to the rotation unit (20);
a first actuator (52) acting on the rotation unit (20) to move the rotation unit (20) in an adjustable fashion about the longitudinal axis (Z);
a second actuator (54) acting on the actuation pin (31) of the ball (30) for moving the ball (30) about the transversal axis (X); and
a transmission unit (40) rotatable about the longitudinal axis (Z) and having, at a relative first end, a first ring gear (41) meshing with a transmission pinion (32) rotationally integral with the actuation pin (31), the second actuator (54) acting on the transmission unit (40) for rotating the first ring gear (41) about the longitudinal axis (Z).

2. The guide module (1) according to claim 1, wherein the transmission unit (40) also comprises, at or close to a relative second end opposite the first, a second ring gear (42) meshing with an actuation pinion (55) on which the second actuator (54) acts.

3. The guide module (1) according to claim 2, wherein the second ring gear (42) is defined by a row of radial teeth facing towards the longitudinal axis (Z) and/or wherein the first ring gear (41) is defined by a respective row of front teeth aligned along the longitudinal axis (Z).

4. The guide module (1) according to claim 1, wherein the first end of the transmission unit (40) has a tubular shape for housing internally at least a part of the ball (30).

5. The guide module (1) according to claim 1, wherein the rotation unit (20) has a tubular shape, extending around the longitudinal axis (Z) and defining an inner space (V) in which are at least partly housed the ball (30) and the respective actuation pin (31).

6. The guide module (1) according to claim 4, wherein the transmission unit (40) is housed in the inner space (V).

7. The guide module (1) according to claim 6, wherein the rotation unit (20) has, in a relative portion opposite or distal from the actuation pin (31) of the ball (30), a respective row of guide teeth (22) meshing with a shaft of the first actuator (52).

8. The guide module (1) according to claim 1, wherein the first and second actuators (52, 54) are mounted in side-by-side configuration and aligned along the longitudinal axis (Z).

9. The guide module (1) according to claim 1, wherein the transmission unit (40) is supported in position by a central pin (43) rotatable about the longitudinal axis (Z).

10. The guide module (1) according to claim 1, also comprising an outer containment body (10) having a tubular shape inside of which are enclosed the rotation unit (20), the transmission unit (40), a main part of the ball (30) and the actuation pin (31) of the ball (30); the rotation unit (20) being rotationally supported by the outer body (10).

11. The guide module (1) according to claim 10, wherein the outer body (10) has a substantially annular end cap (16) having a central opening through which protrudes an apical portion (30a) of the ball (30), the end cap (16) also having an outer surface defining a sliding plane perpendicular to the longitudinal axis (Z).

12. The guide module (1) according to claim 1, comprising a control unit connected to the first and second actuators (52, 54) and configured to receive at least a first control signal of rotation of the ball (30) around the longitudinal axis (Z) and a second control signal of rotation of the ball (30) around the transversal axis (X), the control unit being configured to control the first actuator (52) as a function of the first control signal and to control the second actuator (54) as a function of the second control signal, the control unit also being configured to control the second actuator (54) in a compensated fashion as a function of the first control signal.

13. The guide module (1) according to claim 1, having a prismatic coupling surface configured for connecting a plurality of modules (1) identical to a common mask according to a predetermined orientation to define a movement plane.

14. A modular movement plane for the sorting of objects, comprising:
a plurality of guide modules (1) according to claim 1;
a supporting mask configured for supporting the guide modules (1) in a matrix configuration in such a way as to define a sliding plane engaged by the balls (30) of the guide modules (1).

15. The movement plane according to claim 14, wherein the supporting mask has a plurality of sockets and the guide modules (1) have a plurality of plugs (60) configured to engage the sockets for determining an electrical power supply and/or signal connection between the supporting mask and the guide modules (1) during a positioning of the guide modules (1) in the matrix configuration.

16. The guide module (1) according to claim 4, wherein the transmission unit (40) is housed in the inner space (V) and also has a tubular shape extending around the longitudinal axis (Z).

17. The guide module (1) according to claim 5, wherein the rotation unit (20) has, in a relative portion opposite or distal from the actuation pin (31) of the ball (30), a respective row of guide teeth (22) meshing with a shaft of the first actuator (52) and defined by radial teeth facing towards the longitudinal axis (Z).

18. The guide module (1) according to claim 1, wherein the first and second actuators (52, 54) are mounted in side-by-side configuration and aligned along the longitudinal axis (Z), each of the first and second actuators (52, 54) comprising a respective actuation pinion (53, 55) rotatable about a parallel axis.

19. The guide module (1) according to claim 1, wherein the first and second actuators (52, 54) are mounted in side-by-side configuration and aligned along the longitudinal axis (Z), each of the first and second actuators (52, 54) comprising a respective actuation pinion (53, 55) rotatable about a parallel axis and offset relative to the longitudinal axis (Z).

20. The guide module (1) according to claim 1, also comprising an outer containment body (10) having a tubular shape inside of which are enclosed the rotation unit (20), the transmission unit (40), a main part of the ball (30) and the actuation pin (31) of the ball (30); the rotation unit (20) being rotationally supported by the outer body (10), by interposition of a cup- shaped body (14).

* * * * *